(12) United States Patent
Liang

(10) Patent No.: US 7,753,650 B1
(45) Date of Patent: Jul. 13, 2010

(54) THIN TURBINE ROTOR BLADE WITH SINUSOIDAL FLOW COOLING CHANNELS

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 874 days.

(21) Appl. No.: 11/642,258

(22) Filed: Dec. 20, 2006

(51) Int. Cl.
*F01D 5/18* (2006.01)
(52) U.S. Cl. .................................................. 416/97 R
(58) Field of Classification Search ................. 415/115; 416/96 R, 97 R
See application file for complete search history.

(56) References Cited

U.S. PATENT DOCUMENTS

| | | | |
|---|---|---|---|
| 3,220,697 A | 11/1965 | Smuland et al. | |
| 4,203,706 A * | 5/1980 | Hess | 416/97 A |
| 4,752,186 A | 6/1988 | Liang | |
| 5,370,499 A | 12/1994 | Lee | |
| 5,484,258 A | 1/1996 | Isburgh et al. | |
| 5,690,472 A | 11/1997 | Lee | |
| 5,700,132 A | 12/1997 | Lampes et al. | |
| 5,704,763 A * | 1/1998 | Lee | 416/96 R |
| 5,738,493 A | 4/1998 | Lee et al. | |
| 5,752,801 A | 5/1998 | Kennedy | |
| 5,993,156 A | 11/1999 | Bailly et al. | |
| 6,092,983 A | 7/2000 | Tomita et al. | |
| 6,254,334 B1 | 7/2001 | LaFleur | |
| 6,379,118 B2 | 4/2002 | Lutum et al. | |
| 6,431,832 B1 | 8/2002 | Glezer et al. | |
| 6,533,547 B2 | 3/2003 | Anding et al. | |
| 6,616,406 B2 | 9/2003 | Liang | |
| 6,715,988 B2 | 4/2004 | Leeke et al. | |
| 7,232,290 B2 * | 6/2007 | Draper et al. | 416/97 R |

* cited by examiner

*Primary Examiner*—Edward Look
*Assistant Examiner*—Nathaniel Wiehe
(74) *Attorney, Agent, or Firm*—John Ryznic

(57) ABSTRACT

A turbine rotor blade for use in a gas turbine engine, the rotor blade including a plurality of wavy flow cooling channels extending in the blade chordwise direction from a leading edge supply channel to a trailing edge exit hole. Each wavy flow channel is connected to the leading edge supply passage by a metering hole in order to regulate the cooling air pressure and flow through that channel. The wavy flow channels are formed by ribs that form a sinusoidal flow path for the cooling air to increase the turbulent flow and increase the convective surface area which both lead to a thin rotor blade with increase cooling efficiency and lower cooling air volume than the prior art blades.

6 Claims, 3 Drawing Sheets

THIN TURBINE ROTOR BLADE WITH SINUSOIDAL FLOW COOLING CHANNELS

CROSS-REFERENCE TO RELATED APPLICATIONS

This application is related to U.S. Regular patent application Ser. No. 11/642,255 filed concurrently with this application and by the same inventive entity.

BACKGROUND OF THE INVENTION

1. Field of the Invention

The present invention relates generally to fluid reaction surfaces, and more specifically to turbine airfoils with cooling circuits.

2. Description of the Related Art Including Information Disclosed Under 37 CFR 1.97 and 1.98

A gas turbine engine is very efficient machine that converts the chemical energy of a burning fuel into mechanical energy. An industrial gas turbine (IGT) engine is used in power plants to drive an electric generator to produce electric power. An aero gas turbine engine is used to propel an aircraft. Both types of gas turbine engines benefit from increased efficiency. The efficiency of a gas turbine engine can be increased by increasing the high temperature gas flow that enters the turbine. It is a very important design feature to provide for the first stage stator vanes and rotor blades to have a high heat resistance as possible by using high temperature resistant materials in combination with internal and film cooling of the airfoils (vanes and blades).

Improved cooling of a turbine airfoil will allow for higher gas flow temperature and therefore increased engine efficiency. Maximizing the use of the cooling air will also increase the engine efficiency since less cooling air is required to pass through the turbine airfoils for cooling. Since the compressed cooling air used to cool the internal passages of the turbine airfoil is diverted from the compressor, using less cooling air to provide the same amount of cooling will also increase the engine efficiency.

In the cited prior art references, U.S. Pat. No. 6,379,118 B2 issued to Lutum et al on Apr. 30, 2002 entitled COOLED BLADE FOR A GAS TURBINE discloses in FIG. 3 of this patent a sinusoidal flow cooling passage extending along the wall of the blade to provide near wall cooling to the blade. The sinusoidal flow path is formed by an alternating series of ribs extending perpendicular from the wall surface in the flow direction. The sinusoidal flow path in the Lutum patent does not flow from the leading edge supply passage to the trailing edge region of the blade, nor does the sinusoidal flow passages or channels extend from the pressure side wall to the suction side wall as in the present invention.

Another prior art reference, U.S. Pat. No. 5,752,801 issued to Kennedy on May 19, 1998 entitled APPARATUS FOR COOLING A GAS TURBINE AIRFOIL AND METHOD OF MAKING SAME discloses a sinusoidal flow path extending along the trailing edge region of the blade, where the sinusoidal flow path extends from the pressure side wall to the suction side wall and out the trailing edge through exit holes. The sinusoidal flow passage in the Kennedy patent is one path extending along the spanwise length of the blade and occurs only in the trailing edge region of the blade.

Another prior art reference, U.S. Pat. No. 3,220,697 issued to Smuland et al on Nov. 30, 1965 entitled HOLLOW TURBINE OR COMPRESSOR VANE discloses a turbine airfoil with an internal cooling passage in FIG. 2 of this patent that follows a sinusoidal flow path from the outer shroud to the inner shroud, exiting out a hole in the inner shroud. The Smuland patent does not include a plurality of sinusoidal flow passages, nor does it show a sinusoidal flow passage extending along the blade or airfoil chordwise direction as does the present invention.

It is an object of the present invention to provide for a turbine airfoil, whether it be a stator vane or a rotor blade, with improved heat transfer coefficient from the hot metal to the cooling air passing through the cooling channels. It is also an object of the present invention to provide for a turbine airfoil that will provide the same amount of cooling for the airfoil but with less cooling air flow over the cited prior art references.

BRIEF SUMMARY OF THE INVENTION

The present invention is a cooling circuit arrangement for a turbine rotor blade, but can also be used in a turbine stator vane. The blade includes a cooling air supply passage extending along the leading edge and a plurality if cooling exit holes extending along the trailing edge. Extending along the blade chordwise direction from the leading edge supply passage to the trailing edge exit holes are a plurality of wavy flow cooling channels separated from each other by wavy ribs that form the wavy channels. A metering holes supplies cooling air from the cooling supply passage into a wavy flow channel, with the cooling air being discharged through an exit hole in the trailing edge. The wavy ribs force the cooling air passing through the wavy channel to flow in a sinusoidal direction which promotes high turbulent flow and therefore increased heat transfer coefficient due to impingement and the continuous change of cooling air momentum. The wavy ribs also create high internal convective area for heat transfer from the hot metal surface to the cooling air. The wavy ribs extend from the pressure side wall to the suction side wall of the blade to provide internal cooling for a turbine blade, especially for a thin turbine blade.

DETAILED DESCRIPTION OF THE INVENTION

The present invention is a turbine rotor blade, especially a thin rotor blade, with a wavy flow cooling channel extending along the chordwise direction of the blade to provide improved cooling over the cited prior art references. However, the wavy cooling channels could also be used in a turbine stator vane that requires internal cooling air.

Figure 1:
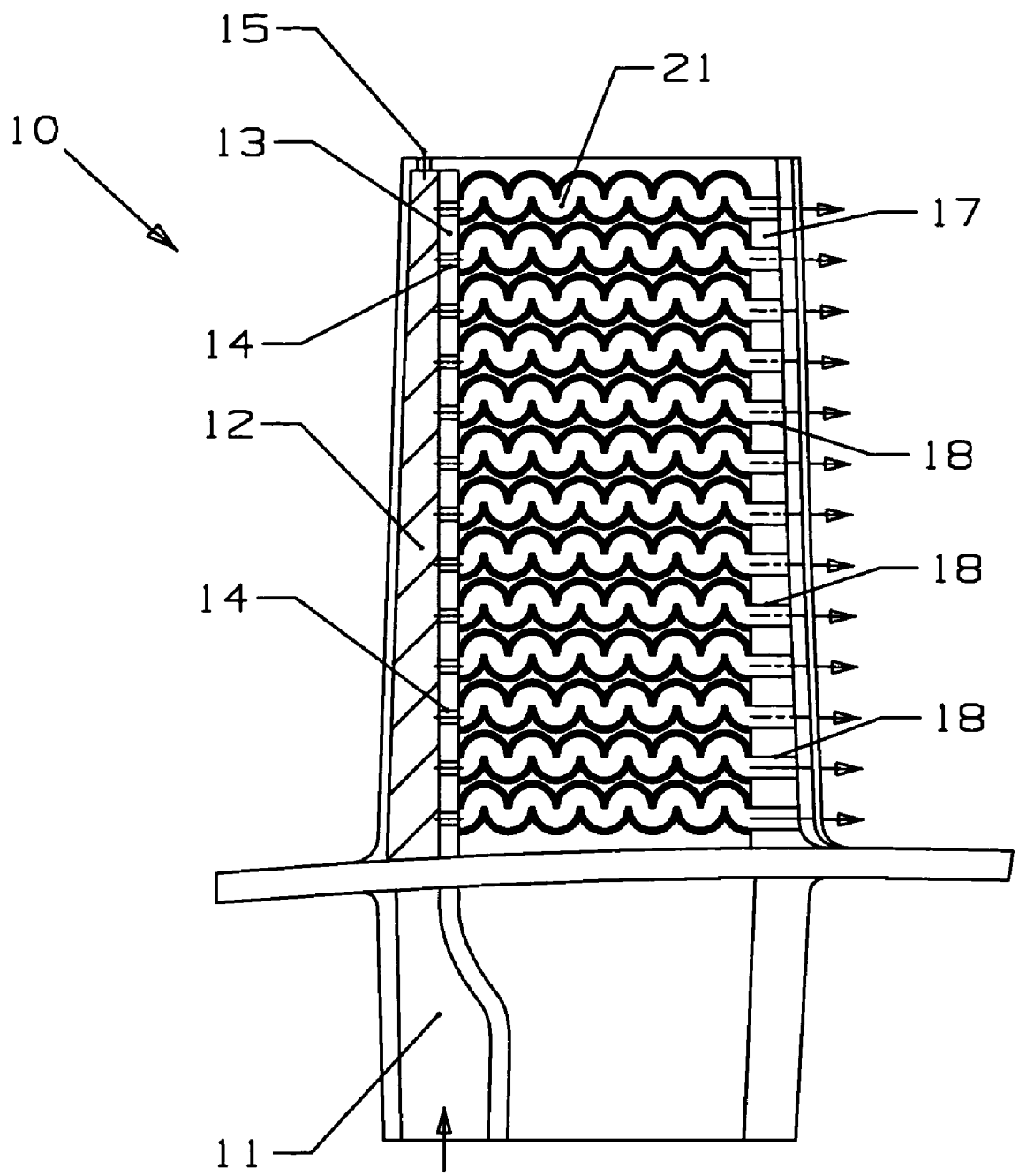
FIG. 1 shows a cross section view of the rotor blade having the wavy flow cooling channels of the present invention.

FIG. 1 shows a rotor blade cross section view with the wavy flow channels extending in the chordwise direction. The turbine blade 10 includes a leading edge and a trailing edge with a pressure side wall and a suction side wall that defines the airfoil surface. The root includes a cooling air supply passage 11 that leads into the leading edge supply channel 12 extending along the leading edge of the blade. Trip strips 28 are placed along the inner wall surfaces of the supply channel 12 to promote turbulent flow. A rib 13 divides the leading edge supply channel 11 from the remaining portions of the blade 10 and includes a plurality of metering holes 14 to pass cooling air into the wavy flow channels 21. The wavy flow channels 21 extend from the metering hole 14 toward the trailing edge and end at cooling air exit holes 18 that are formed along the trailing edge 17 of the blade. Each wavy flow channel 21 is supplied by a single metering hole 14 and discharges cooling air through a single exit hole 18. However, more than one metering hole could be used, and more than one exit hole could be used without departing from the spirit and scope of the present invention. At the end of the supply channel 12 is one or more blade tip exit holes 15 to provide cooling to the blade tip.

Figure 2:
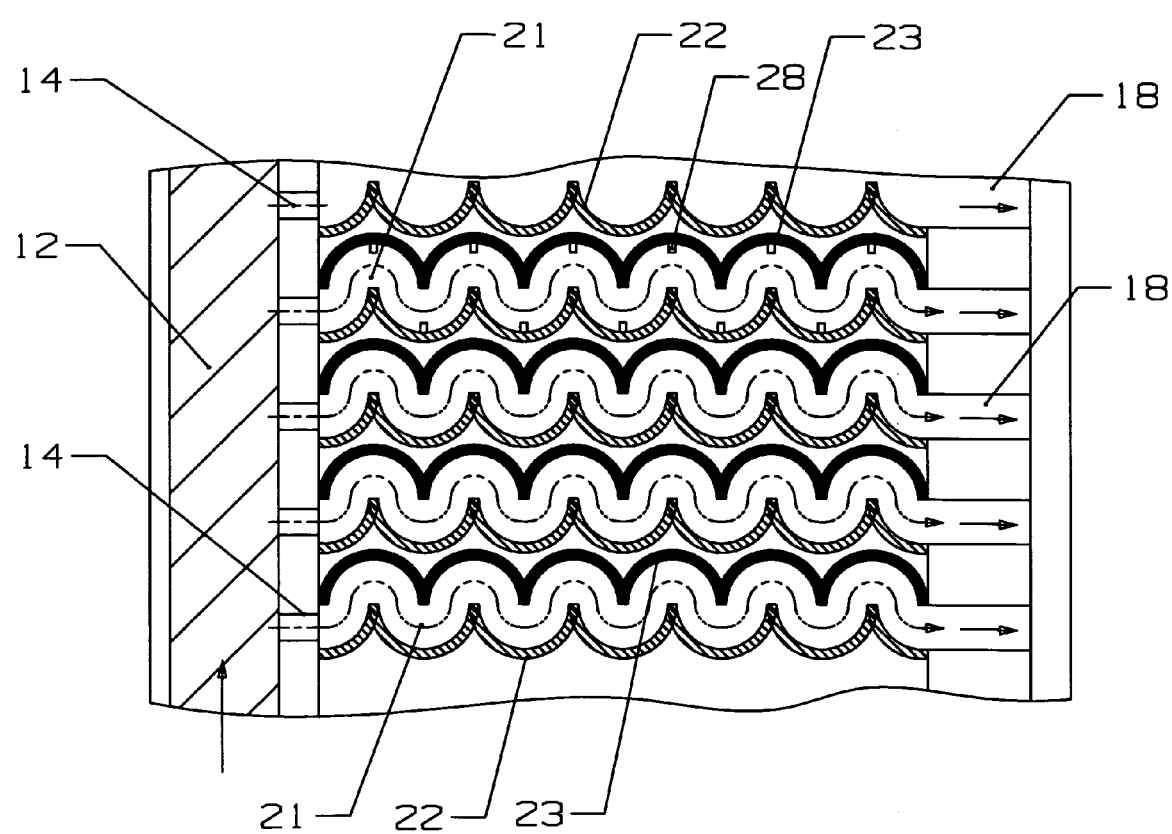
FIG. 2 shows a cross section view of a close up of the wavy flow channels in the present invention.

The wavy flow channels 21 of the present invention are shown in more detail in FIG. 2. Each wavy flow channel 21 is formed by two adjacent wavy ribs 22 and 23. The adjacent ribs 22 and 23 in FIG. 2 are shown with a space between them. However, the two ribs 22 and 23 (one darkened and one lightened in FIG. 2) are formed as a single rib without the space referred to above extending chordwise and form the bottom surface of one channel and the top surface of another channel. One wavy rib 22 is formed of half circles connected in series such that they form concave openings facing upward toward the blade tip. The other wavy rib 23 has a similar form and shape but the concave openings face downward toward the root and are offset from the concave openings of the adjacent wavy rib 22 by one half the circle diameter as seen in FIG. 2. The tips of the wavy ribs are arranged along substantially a straight line. The wavy ribs 22 and 23 form the wavy flow channels 21 that result in a cooling air flow in a sinusoidal path through the channels 21. Also, the wavy ribs form a larger surface area for convective heat transfer from the hot metal surface to the cooling air.

Figure 3:
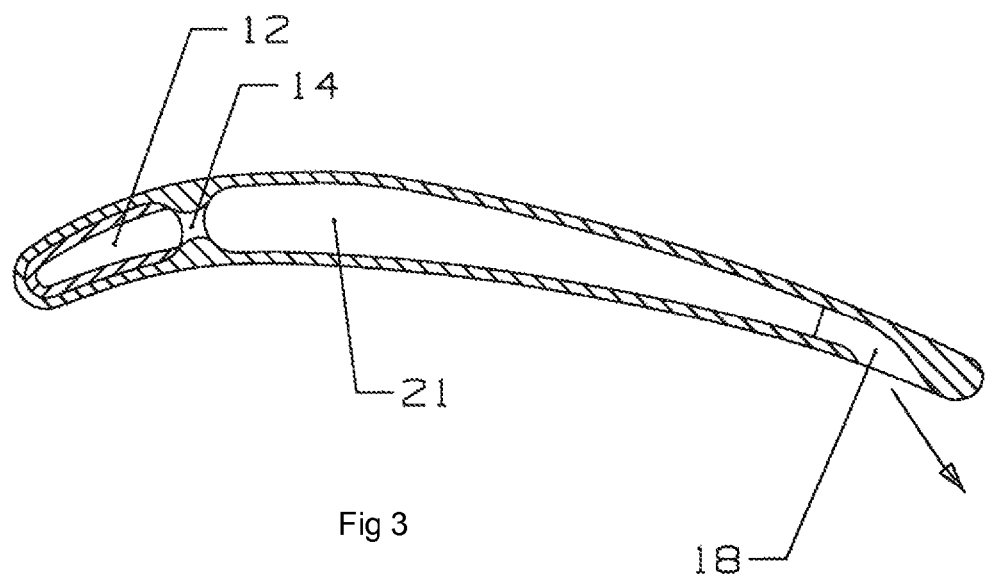
FIG. 3 shows a top view of a cross section through one of the wavy flow channels in the present invention.

As seen in FIG. 1, the wavy flow channels 21 extend from the platform to the tip of the blade to provide internal cooling for the entire airfoil surface. FIG. 3 shows a top view of a single wavy flow channel through the blade. The cooling air supply passage 12 includes trip strips extending along the pressure side, the leading edge and the suction side of the passage. The metering hole 14 meters cooling air from the supply passage 12 into the wavy flow channel 21. The metering holes are used so that the pressure and amount of cooling air flowing through an individual wavy flow channel 21 can be regulated. This allows the turbine airfoil designer to customize the resulting metal temperature of the airfoil at specific locations to eliminate hot spots. The wavy flow channel 21 extends from the pressure side wall to the suction side wall of the blade. The exit hole 18 opens onto the pressure side of the trailing edge of the blade 10 to provide cooling to the trailing edge. The exit holes 18 could also be formed in the trailing edge between the two sides (pressure side and suction side) of the blade as in some thicker airfoils. Trips strips could also be included on the inner walls of the wavy flow channels to also enhance the turbulent flow of the cooling air.

Figure 4:
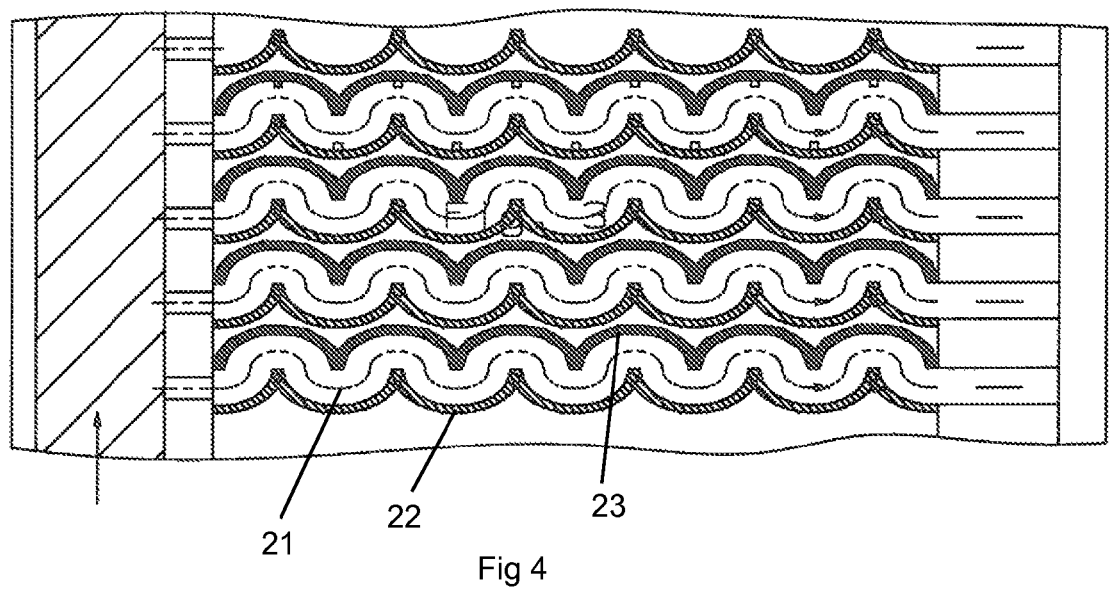
FIG. 4 shows a cross section view of a second embodiment of the wavy flow cooling channels in the present invention.

The wavy flow channels 21 in the present embodiment are shown to be formed from circular shaped openings. However, the wavy flow path could be formed from a series of elliptical shaped openings in which the major axis (axis from tip to tip of the openings) is longer than the minor axis (depth of the opening) as seen in the FIG. 4 embodiment. A sinusoidal flow path would also be achieved with the elliptical openings. The wavy flow channels 21 form a closed path from the metering hole 14 to the exit hole 18 such that cooling air flows do not mix. This allows for the pressure and volume of cooling air to be controlled and hot spots eliminated. The ribs 22 and 23 that form the wavy flow channels 21 are shown in FIG. 2 to have concave portion spaced between the tips. However, the wavy ribs can be sinusoidal shaped themselves such that the concave portions are formed between convex portions that are curved inward and not formed from tips like in FIG. 2. The wavy rib that forms one wall of the wavy flow channel would have a series of alternating concave and convex shaped surfaces that combined with a similar rib but offset would produce the sinusoidal flow path through the channel. In this embodiment, the length between tips or convex peaks would be at least twice the length of the radius of the concave portion. In the first embodiment, the radius of the concave opening would be equal to twice the length from the tips since this would be equal to the diameter of the concave shaped opening. It is preferred that the length from the tips or peaks would be at least the radius of the concave opening or the length from the peak to the valley of the wavy rib.

I claim the following:

1. A turbine airfoil for use in a gas turbine engine, the turbine airfoil comprising:
   a cooling air supply passage located along the leading edge of the airfoil;
   a plurality of wavy flow channels extending along the airfoil chordwise direction from a leading edge region to a trailing edge region;
   metering holes to connect the cooling air supply passage to the wavy flow channels;
   a plurality of trailing edge exit holes arranged along the trailing edge region of the airfoil, the exit holes being connected to the wavy flow channels; and,
   the wavy flow channels are formed by wavy ribs having a series of half circular shaped members connected together.

2. The turbine airfoil of claim 1, and further comprising:
   adjacent wavy ribs are offset about one half of the diameter of the half circular shaped member.

3. A turbine airfoil for use in a gas turbine engine, the turbine airfoil comprising:
   a cooling air supply passage located along the leading edge of the airfoil;
   a plurality of wavy flow channels extending along the airfoil chordwise direction from a leading edge region to a trailing edge region;
   metering holes to connect the cooling air supply passage to the wavy flow channels;
   a plurality of trailing edge exit holes arranged along the trailing edge region of the airfoil, the exit holes being connected to the wavy flow channels; and,
   the wavy channels are formed by wavy ribs each having a series of concave openings on the top and bottom of the wavy rib with the top openings being offset from the bottom openings by about one half of the diameter of the opening.

4. The turbine airfoil of claim 3, and further comprising:
   tips of the wavy ribs that form a wavy flow channel are aligned substantially along a straight line.

5. A turbine airfoil for use in a gas turbine engine, the turbine airfoil comprising:
   a cooling air supply passage located along the leading edge of the airfoil;
   a plurality of wavy flow channels extending along the airfoil chordwise direction from a leading edge region to a trailing edge region;
   metering holes to connect the cooling air supply passage to the wavy flow channels;
   a plurality of trailing edge exit holes arranged along the trailing edge region of the airfoil, the exit holes being connected to the wavy flow channels; and, the wavy flow channels are formed by wavy ribs having a series of half elliptical shaped members connected together with the major axis longer than the minor axis.

6. A turbine airfoil for use in a gas turbine engine, the turbine airfoil comprising:

a cooling air supply passage located along the leading edge of the airfoil;

a plurality of wavy flow channels extending along the airfoil chordwise direction from a leading edge region to a trailing edge region;

metering holes to connect the cooling air supply passage to the wavy flow channels;

a plurality of trailing edge exit holes arranged along the trailing edge region of the airfoil, the exit holes being connected to the wavy flow channels; and, the wavy flow channels form a cooling air flow path of substantially the same radial height along the wavy flow channel.

\* \* \* \* \*